A. CAMPBELL.
DUMP CAR.
APPLICATION FILED JAN. 27, 1909.

977,433.

Patented Dec. 6, 1910.
3 SHEETS—SHEET 1.

Witnesses:
H. M. Munday.
Pearl Abrams.

Inventor.
Argyle Campbell.
By Munday, Evarts, Adcock & Clarke
His Attys.

A. CAMPBELL.
DUMP CAR.
APPLICATION FILED JAN. 27, 1909.

977,433.

Patented Dec. 6, 1910.
3 SHEETS—SHEET 2.

A. CAMPBELL.
DUMP CAR.
APPLICATION FILED JAN. 27, 1909.
977,433.
Patented Dec. 6, 1910.
3 SHEETS—SHEET 3.
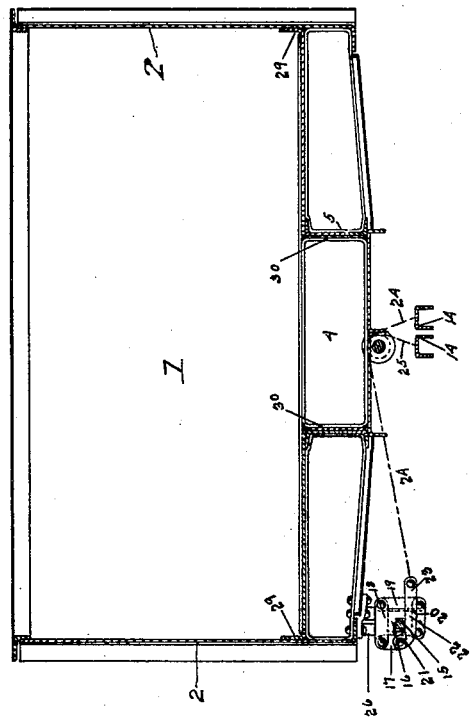

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP-CAR.

977,433.   Specification of Letters Patent.   Patented Dec. 6, 1910.

Application filed January 27, 1909. Serial No. 474,395.

*To all whom it may concern:*

Be it known that I, ARGYLE CAMPBELL, a citizen of the United States, residing in Chicago, in the county of Cook and State of Illinois, have invented a new and useful Improvement in Dump-Cars, of which the following is a specification.

My invention relates to improvements in dump cars.

My invention consists in a dump car, the body of which is provided in its bottom with a series of tandem arranged discharge openings extending longitudinally between the center sills a greater distance than the clear space between the car wheels, in connection with a plurality of tandem pairs of longitudinally hinged doors closing said discharge openings, the two left side doors of two adjacent tandem pairs being connected together by bridge members spanning the transverse sill or frame member of the car body so that said two left side door members may be operated together as one, and the two right side doors of such pairs being likewise connected together by a bridge member and similarly so operated as one, and the two right side and the two left side doors of the two tandem arranged pairs being connected to and simultaneously operated by one and the same door operating mechanism.

My invention further consists in the novel construction of parts and devices and in the novel combinations of parts and devices herein shown and described.

Figure 1:
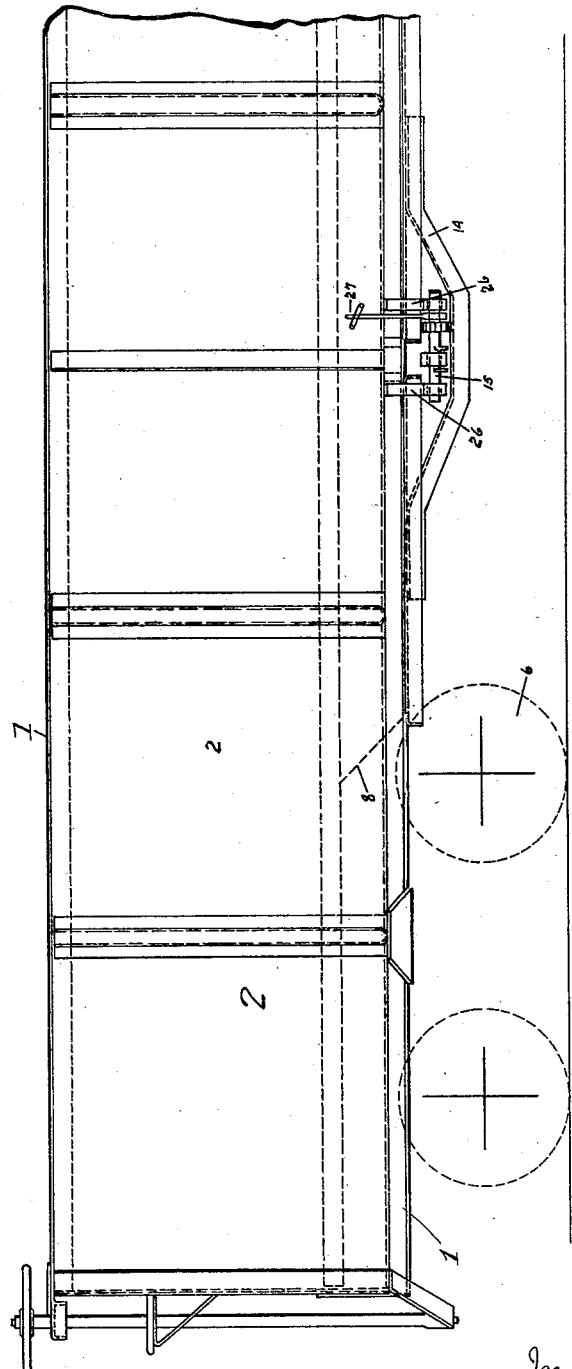
Figure 2:
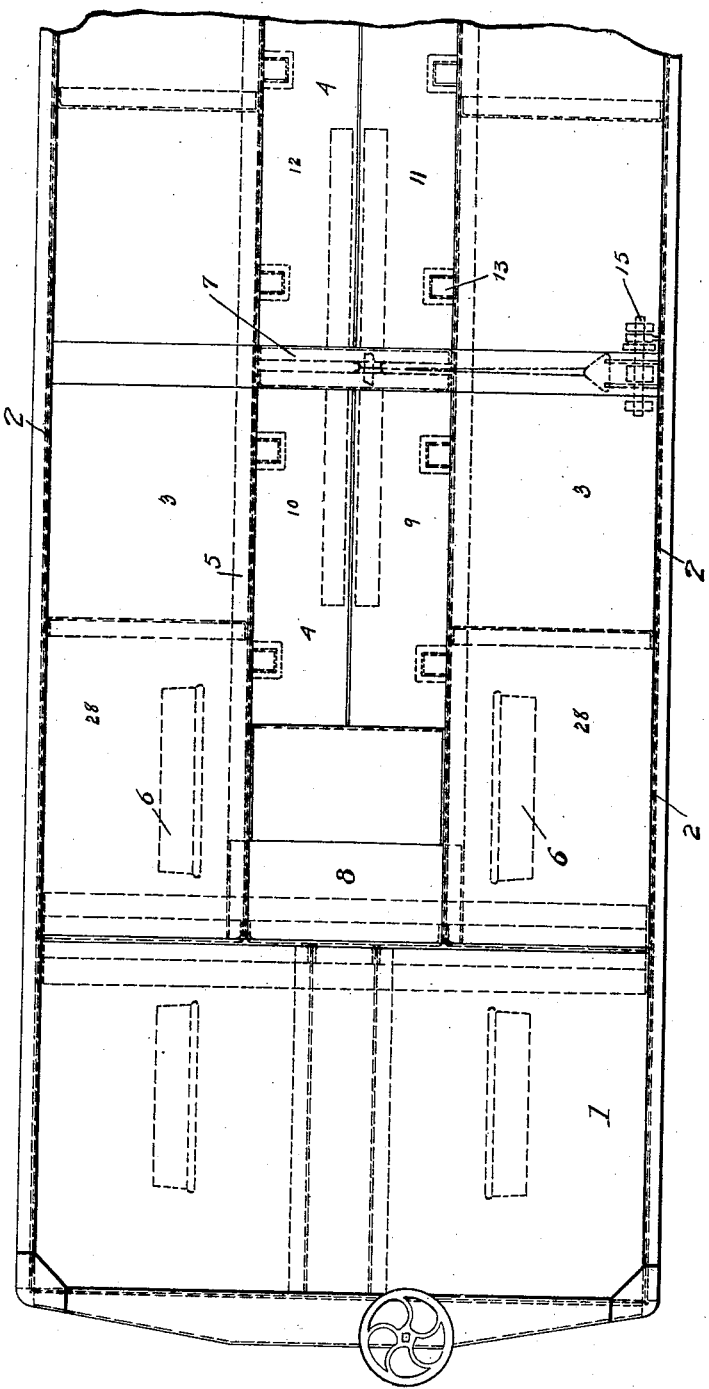

In the accompanying drawing forming a part of this specification, Figure 1 is a side elevation of a dump car embodying my invention, one duplicate half of the car being omitted. Fig. 2 is a plan view of the same. Fig. 3 is a vertical cross section.

In the drawing, 1 represents the body of a dump car having upright sides 2 and bottom or floor 3, furnished with a series of tandem arranged discharge openings 4 extending between the center sills 5 a greater distance than the clear space between the innermost wheels 6 of the car, the tandem arranged discharge openings 4 being separated from each other by the transverse sills, transoms or frame members 7 of the car body. The terminal discharge openings 4 extend at each end of the car between the car wheels 6, 6 on opposite sides of the car. At each end of the car adjacent to the end of the terminal discharge opening 4, the bottom or floor of the car is provided with an inclined end or bottom plate 8.

The tandem arranged discharge openings 4, 4 for each longitudinal half of the car body are closed by two tandem arranged pairs of doors, 9, 10 and 11, 12. Each pair of doors 9, 10 and 11, 12 are connected by hinges 13 to the car frame at the longitudinal side edges of the discharge openings 4, 4. The two doors, 9, 11, on the one side of the central, longitudinal line of the car, of two adjacent tandem arranged pairs are rigidly connected together by a bent bridge member 14 which is securely bolted or riveted on the under sides of said doors 9, 11, said bent bridge member spanning the transverse frame member 7 of the car body, which extends transversely between the pair of doors 9, 10 and the pair of doors 11, 12. The two doors 10, 12 on the other side of the longitudinal central line of the car of the two adjacent tandem arranged pairs of doors 9, 10 and 11, 12 are likewise rigidly connected together by a similar bent bridge member 14. The connected doors 9, 11 and the connected doors 10, 12 may be simultaneously opened and closed by any suitable door operating mechanism. The door operating mechanism, however, which I prefer to employ, and which is illustrated in the drawing, consists essentially of a short operating shaft 15 furnished with a polygonal or four sided drum 16 around which is wound four connecting links 17, 18, 19 and 20, the terminal link 17 having a locking shoulder 21 which engages a locking shoulder 22 on the drum, and which terminal link 17, through a supplemental link 23, is connected by connecting chains 24 and 25 with the bridge members 14 and 14 of the side doors 9, 11 and the side doors 10, 12. The short operating shaft 15 is journaled in suitable brackets 26 attached to the car body near one side thereof, and this operating shaft is furnished with a suitable operating lever 27 having a pawl engaging a ratchet on the operating shaft 13.

The bottom or floor 3 of the car body at each side of the center sills 5 is preferably composed of long, continuous steel plates 28, which may preferably extend continuously for half the length or the whole length of the car body, and each of which preferably extends in width from the center sill 5 to the outer longitudinal edge of the car body and is provided at such outer longitudinal edge with an integral upturned flange 29 and at its inner edge with an integral downturned flange 30 which may preferably be as deep as the center sills. These deep flanged continuous floor plates 28 thus materially strengthen the center sills and car framework, and thereby materially reduce the cost of the car.

As in my invention a single door operating mechanism suffices for the operation of four doors or two tandem arranged pairs of doors, the rights and lefts of the two pairs being connected together by the bridge members 14, the construction and operation of the car is further greatly simplified and its cost materially reduced. And as in my invention, the tandem arranged discharge openings extend longitudinally of the car between the center sills for a greater distance than the clear space between the two innermost pairs of wheels, I am enabled with my dump car to discharge nearly the entire load without handling or shoveling.

Another important feature in the type of this car is the simple and inexpensive mechanism for closing the doors which as already mentioned is done by means of a very short shaft longitudinally of the car and its location being parallel to the hinged edge of the door and for convenience at the outer side of the car.

I claim:—

1. The combination of a car body, a series of tandem arranged longitudinally hinged doors, transverse transoms extending between the ends of the adjacent doors, a short longitudinal operating shaft under one of said transoms less in length than one door arranged to operate a plurality of doors, substantially as specified.

2. The combination of a car body with tandem arranged longitudinally hinged doors, transverse transoms extending between the ends of the adjacent doors, a short longitudinal shaft under one of said transoms with a drum thereon and connections to doors arranged to close a plurality of openings, said operating shaft being less in length than a single opening, substantially as specified.

ARGYLE CAMPBELL.

Witnesses:
H. W. MUNDAY,
PEARL ABRAMS.